US008831220B2

(12) United States Patent
McCown et al.

(10) Patent No.: US 8,831,220 B2
(45) Date of Patent: Sep. 9, 2014

(54) PROCESSING MODULE OPERATING METHODS, PROCESSING MODULES, AND COMMUNICATIONS SYSTEMS

(75) Inventors: Steven Harvey McCown, Rigby, ID (US); Kurt W. Derr, Idaho Falls, ID (US); Troy Moore, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1350 days.

(21) Appl. No.: 11/948,272

(22) Filed: Nov. 30, 2007

(65) Prior Publication Data

US 2009/0141896 A1 Jun. 4, 2009

(51) Int. Cl.
*H04K 1/00* (2006.01)
*H04L 29/06* (2006.01)
*H04L 9/32* (2006.01)
*G06Q 20/38* (2012.01)
*G06Q 20/32* (2012.01)
*H04W 12/02* (2009.01)

(52) U.S. Cl.
CPC ........ *G06Q 20/3223* (2013.01); *H04L 63/0428* (2013.01); *H04L 9/3226* (2013.01); *G06Q 20/3823* (2013.01); *G06Q 20/3278* (2013.01); *G06Q 20/3226* (2013.01); *G06Q 20/385* (2013.01); *H04L 2209/80* (2013.01); *G06Q 20/3821* (2013.01); *H04W 12/02* (2013.01)
USPC .......... 380/255; 380/259; 380/270; 713/192; 713/193; 713/194; 726/26

(58) Field of Classification Search
CPC .............. H04L 63/0428; H04L 9/3226; H04L 2209/80; G06Q 20/3223; G06Q 20/3226; G06Q 20/3278; G06Q 20/3821; G06Q 20/385; G06Q 20/3823; H04W 12/02
See application file for complete search history.

(56) References Cited

U.S. PATENT DOCUMENTS

| 6,055,314 | A | * | 4/2000 | Spies et al. ..................... 380/228 |
| 6,711,262 | B1 | * | 3/2004 | Vatanen ........................ 380/277 |
| 6,779,115 | B1 | | 8/2004 | Naim |
| 6,831,982 | B1 | | 12/2004 | Hughes et al. |
| 6,957,342 | B2 | * | 10/2005 | Vatanen ........................ 713/192 |
| 7,010,809 | B2 | * | 3/2006 | Hori et al. ........................ 726/26 |
| 7,024,395 | B1 | | 4/2006 | McCown et al. |

(Continued)

OTHER PUBLICATIONS

PCT, International Search Report and Written Opinion, PCT/US09/35205 (International filing date Feb. 26, 2009), mailed Nov. 6, 2009.

(Continued)

*Primary Examiner* — Shewaye Gelagay
(74) *Attorney, Agent, or Firm* — Ascenda Law Group, PC

(57) ABSTRACT

A processing module operating method includes using a processing module physically connected to a wireless communications device, requesting that the wireless communications device retrieve encrypted code from a web site and receiving the encrypted code from the wireless communications device. The wireless communications device is unable to decrypt the encrypted code. The method further includes using the processing module, decrypting the encrypted code, executing the decrypted code, and preventing the wireless communications device from accessing the decrypted code. Another processing module operating method includes using a processing module physically connected to a host device, executing an application within the processing module, allowing the application to exchange user interaction data communicated using a user interface of the host device with the host device, and allowing the application to use the host device as a communications device for exchanging information with a remote device distinct from the host device.

16 Claims, 6 Drawing Sheets

(56) References Cited

U.S. PATENT DOCUMENTS

| | | | | |
|---|---|---|---|---|
| 2003/0092434 | A1* | 5/2003 | Irisawa | 455/418 |
| 2004/0031856 | A1 | 2/2004 | Atsmon et al. | |
| 2004/0107219 | A1 | 6/2004 | Rosenberger | |
| 2005/0038707 | A1 | 2/2005 | Roever et al. | |
| 2005/0068169 | A1 | 3/2005 | Copley et al. | |
| 2005/0120225 | A1* | 6/2005 | Kirsch et al. | 713/183 |
| 2005/0188194 | A1 | 8/2005 | Fascenda | |
| 2005/0234860 | A1 | 10/2005 | Roever et al. | |
| 2005/0250440 | A1 | 11/2005 | Zhou et al. | |
| 2006/0135121 | A1 | 6/2006 | Abedi et al. | |
| 2006/0165078 | A1 | 7/2006 | Gopinath et al. | |
| 2007/0011729 | A1 | 1/2007 | White | |
| 2007/0057038 | A1 | 3/2007 | Gannon | |
| 2007/0087756 | A1 | 4/2007 | Hoffberg | |
| 2007/0198432 | A1 | 8/2007 | Pitroda et al. | |
| 2007/0226807 | A1 | 9/2007 | Ginter et al. | |
| 2007/0241182 | A1 | 10/2007 | Buer | |
| 2007/0250393 | A1 | 10/2007 | Alberth, Jr. et al. | |
| 2008/0010215 | A1 | 1/2008 | Rackley, III et al. | |
| 2008/0025238 | A1 | 1/2008 | McCown et al. | |
| 2008/0280592 | A1 | 11/2008 | McCown et al. | |
| 2008/0291013 | A1 | 11/2008 | McCown et al. | |
| 2009/0070599 | A1* | 3/2009 | Nishimura et al. | 713/193 |
| 2009/0216680 | A1 | 8/2009 | McCown et al. | |
| 2009/0216681 | A1 | 8/2009 | McCown et al. | |
| 2012/0196529 | A1* | 8/2012 | Huomo et al. | 455/41.1 |

OTHER PUBLICATIONS

Heydt-Benjamin, et al., "RFID Payment Card Vulnerabilities Technical Report," Oct. 11, 2006, pp. 1-6.

Heydt-Benjamin, et al., "Vulnerabilities in First-Generation RFID-enabled Credit Cards," Oct. 22, 2006, pp. 1-17.

Bellare, Mihir, et al., "Keying Hash Functions for Message Authentication," Jun. 1996, pp. 1-19.

Bellare, Mihir, et al., "Message Authentication using Hash Functions—The HMAC Construction," RSA Laboratories' CryptoBytes, vol. 2, No. 1, Spring 1996, p. 1-5.

Wong, Ford-Long, et al., "Repairing the Bluetooth pairing protocol," Security Protocols 2005, pp. 1-17.

"The Keyed-Hashed Message Authentication Code (HMAC)," FIPS PUB 198, Mar. 6, 2002.

"RFID Reference Model," CE RFID, Version 2007-2-1, Jan. 10, 2007.

McCown, U.S. Appl. No. 12/196,806, Systems and Methods for Performing Wireless Financial Transactions, filed Aug. 22, 2008.

McCown et al, U.S. Appl. No. 12/196,669, Systems and Methods for Performing File Distribution and Purchase, filed Aug. 22, 2008.

Borselius, N., "Multi-agent system security for mobile communication," Technical Report, Sep. 1, 2003, Royal Holloway University of London <URL:https://eprints.kfupm.edu.sa/52066/1/52066.pdf>. pp. 1-215.

PCT International Search Report and Written Opinion of the International Searching Authority for PCT/IB08/03377, mailed Jul. 13, 2009, 9 pages.

Borselius, N., "Multi-agent system security for mobile communication", Technical Report, Royal Holloway University of London, Sep. 1, 2003.

"FBI taps cell phone mic as evesdropping tool", http://news.com.com/210-1029_6140191.html, Dec. 1, 2006, 4 pages.

"Multi-Tasking Cell Phone Signal Detection System", www.antennasystems.com/cellphonedetector.html, copyright 2004-2006; printed Apr. 6, 2006, 3 pages.

PCT, International Search Report and Written Opinion, PCT/IB08/03377 (International filing date Dec. 8, 2008), mailed Jul. 13, 2009.

PCT, International Search Report, PCT/US08/62675 (International filing date May 5, 2008), mailed Dec. 5, 2008.

PCT, International Search Report, PCT/US09/32273 (International filing date Jan. 28, 2009), mailed Mar. 13, 2009.

PCT, International Search Report, PCT/US09/32279 (International filing date Jan. 28, 2009), mailed Mar. 16, 2009.

* cited by examiner

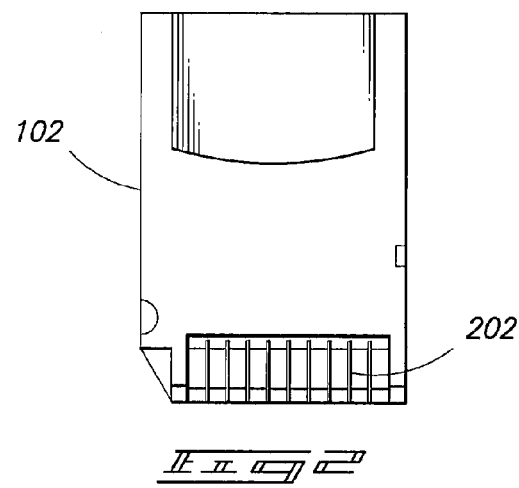
F I G 2
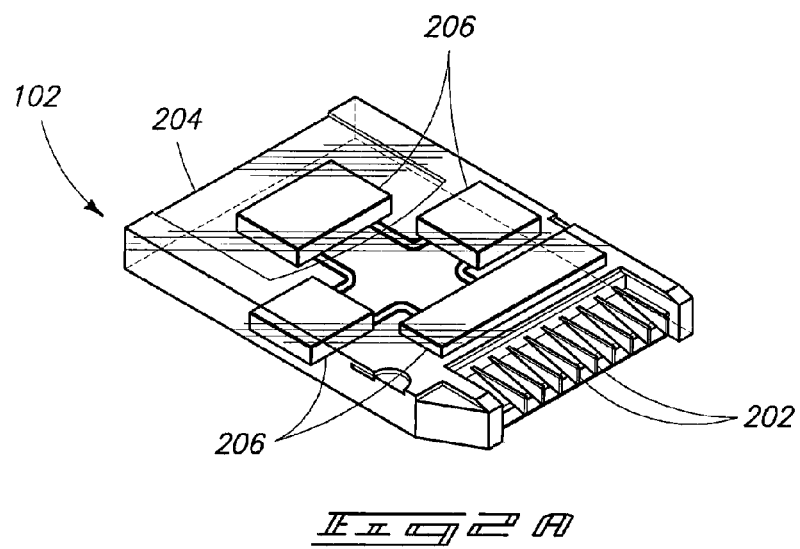
F I G 2 A

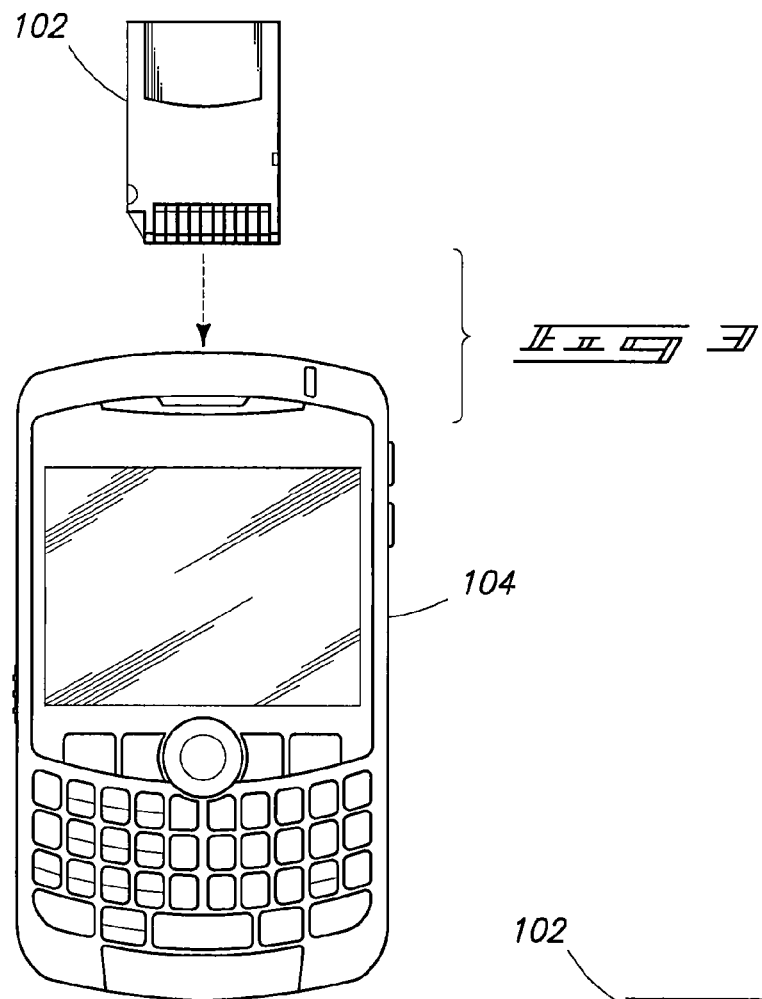
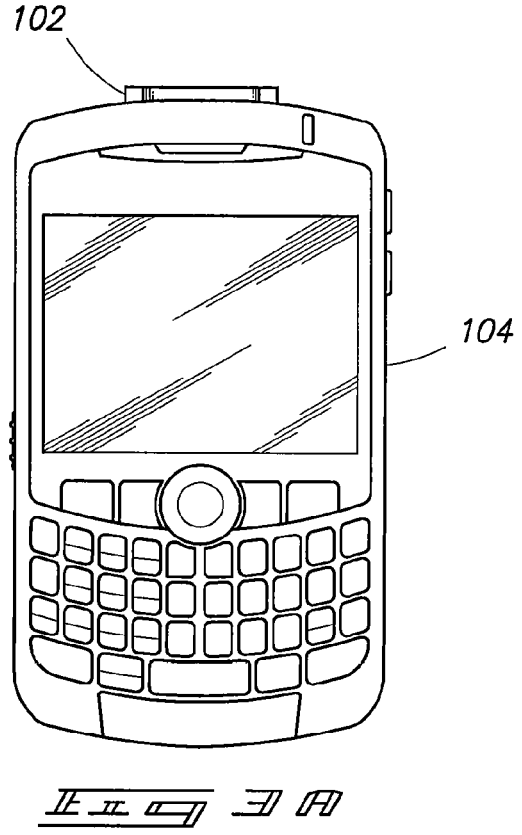

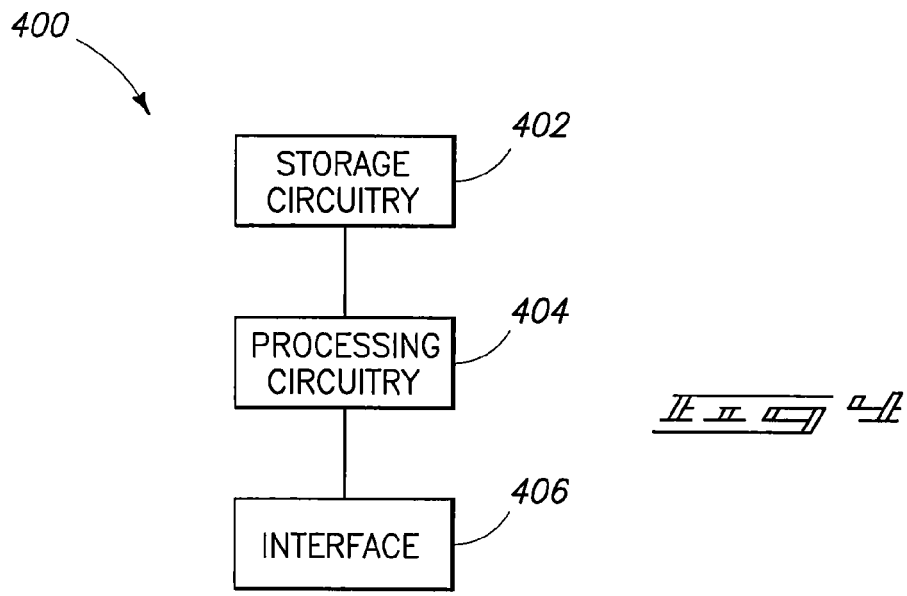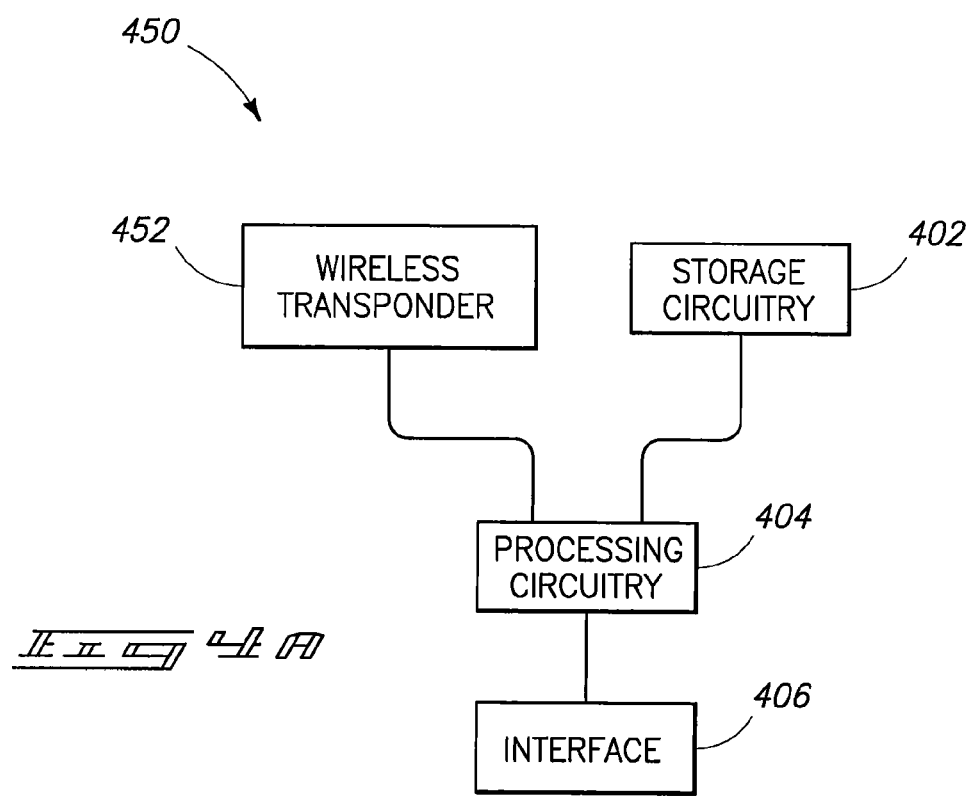

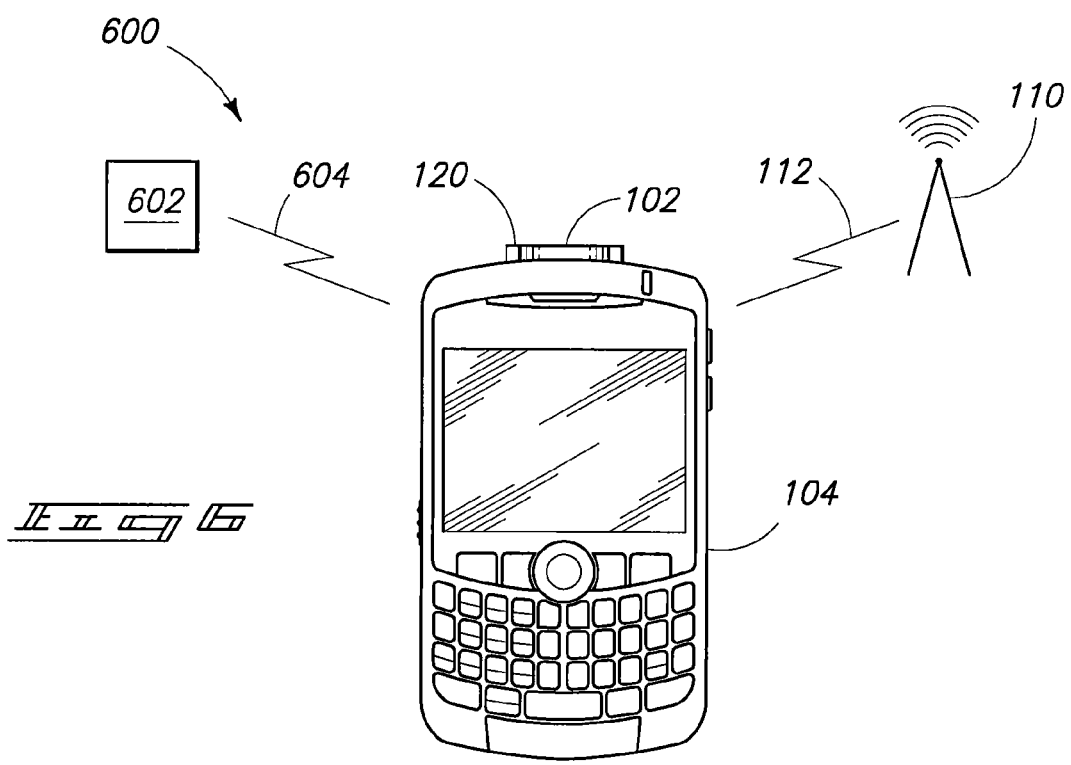

PROCESSING MODULE OPERATING METHODS, PROCESSING MODULES, AND COMMUNICATIONS SYSTEMS

CONTRACTUAL ORIGIN OF THE INVENTION

The United States Government has certain rights in this invention pursuant to Contract No. DE-AC07-05-ID14517 between the United States Department of Energy and Battelle Energy Alliance, LLC.

TECHNICAL FIELD

The present disclosure relates to processing module operating methods, processing modules, and communications systems.

BACKGROUND OF THE DISCLOSURE

For many years, cellular telephones were designed primarily to provide wireless voice communications. With new advances in technology, however, additional functionality has been added to cellular telephones, which are sometimes referred to as personal wireless devices. For example, personal wireless devices including the functionality of a cellular phone, personal digital assistant, email client, media player, and a digital camera are now common. Due to the increased capabilities of these devices, many subscribers are using the devices to store or access sensitive information (e.g., financial account information) or to access private networks (e.g., corporate networks). At least some aspects of the disclosure may be beneficial to users of wireless devices including cellular communications devices.

BRIEF DESCRIPTION OF THE DRAWINGS

Preferred embodiments of the disclosure are described below with reference to the following accompanying drawings.

FIG. 2 is a front view of a processing module according to one embodiment.

FIG. 2A is an isometric view of a processing module according to one embodiment.

FIG. 3 is a front view of a communications system according to one embodiment.

FIG. 3A is another front view of a communications system according to one embodiment.

FIG. 4 is a block diagram of a processing module according to one embodiment.

FIG. 4A is another block diagram of a processing module according to one embodiment.

FIG. 6 is another illustrative representation of a communications system according to one embodiment.

DETAILED DESCRIPTION

This disclosure of the invention is submitted in furtherance of the constitutional purposes of the U.S. Patent Laws "to promote the progress of science and useful arts." (Article 1, Section 8).

According to some embodiments of the disclosure, processing modules, processing module operating methods, and communications systems are described. In one embodiment, a processing module is physically connected to a host device such as a cellular wireless communications device. The processing module executes code in an environment that is separate and/or isolated from the cellular wireless communications device in one embodiment. In another embodiment, a processing module includes wireless communications circuitry (e.g., a transponder such as an RFID tag). Additional aspects of the disclosure are described in the illustrative embodiments below.

Figure 1:
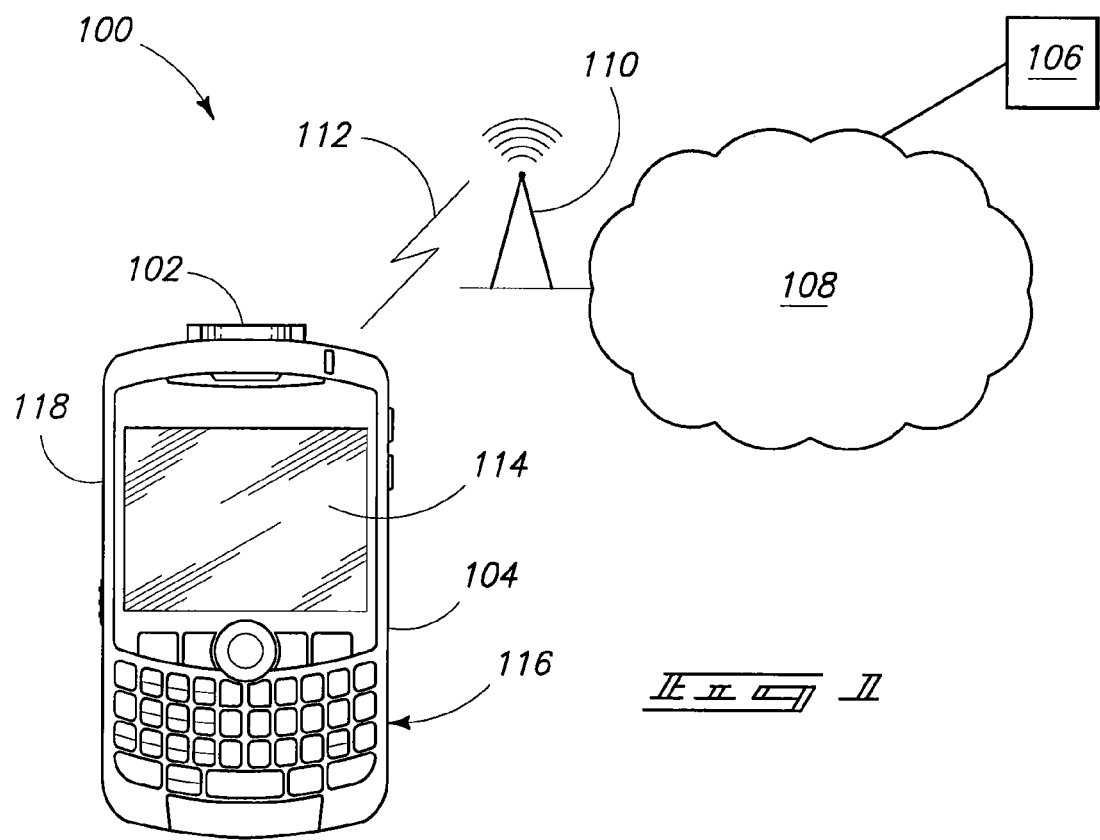
FIG. 1 is an illustrative representation of a communications system according to one embodiment.

Referring to FIG. 1, a communications system 100, according to one embodiment, is illustrated. System 100 includes a processing module 102, a host device 104, a server 106, a network 108, and a wireless communications base station 110 in the depicted example.

Host device 104, in one embodiment, may be a wireless communications device. Host device 104 may communicate with base station 110 using a wireless channel 112, which may be a cellular wireless channel. In one embodiment, base station 110 may be a terrestrial cellular base station and host device 104 may be a cellular wireless communication device, such as a smart phone, blackberry, laptop computer, etc., configured to communicate with a terrestrial cellular base station. Base station 110 may communicate with network 108. In one embodiment, network 108 may be a communications network such as the Internet, the public switched telephone network, or any other arrangement for implementing communications.

Processing module 102 may be physically connected to host device 104 in one embodiment. For example, processing module 102 may be a card configured to be inserted into host device 104. Although physically connected to host device 104, processing module 102 may execute code independently and/or isolated from host device 104 in one embodiment.

For example, processing module 102 may execute code configured to display an electronic book, code configured to perform an online financial transaction, or code configured to encrypt financial information. Executing the code in isolation on processing module 102 rather than on host device 104 may protect data generated by the code against unauthorized access, for example, by malicious software installed on host device 104, by a user of host device 104, or by a device having connectivity to host device 104 through network 108 and base station 110.

In one embodiment, processing module 102 may request that host device 104 retrieve the code from server 106 (e.g., a web server, Supervisory Control and Data Acquisition (SCADA) server, corporate network server, online banking server, or other server). Host device 104 may retrieve the code from server 106 via wireless channel 112, base station 110, and network 108 and then provide the code to processing module 102, which may then execute the code.

In one embodiment, the code may be encrypted code. Server 106 may be configured to encrypt the code and processing module 102 may be configured to decrypt the code. In one embodiment, host device 104 is unable to decrypt the encrypted code. Accordingly, upon retrieving encrypted code from server 106, host device 104 may forward the encrypted code to processing module 102 without decrypting the code.

Processing module 102 may additionally or alternatively request that host device 104 send code to server 106. For example, processing module 102 may encrypt financial information (e.g., an account number, a personal identification number, etc.), provide the encrypted information to host device 104, and instruct host device 104 to send the encrypted information to server 106. Since the information, in this example, is encrypted, host device 104 may be unable to decrypt the financial information.

In one embodiment, processing module 102 may store sensitive information such as access credentials for a secure private network, financial information, or encryption information. In some cases, processing module 102 may be programmed with the sensitive information by an entity concerned with the sensitive information prior to connecting processing module 102 to host device 104. For example, a corporation having a secure private network may program processing module 102 to have access credentials used to gain access to the secure private network.

Once processing module 102 has been programmed, the corporation may give processing module 102 to an employee who may then connect processing module 102 to a host device that may or may not be owned by the corporation. The employee may then use processing module 102 to gain access to the secure private network in order to access files, process email, and the like. Since the access credentials may be stored on processing module 102 prior to giving processing module 102 to the employee, the access credentials may be inaccessible to the employee. Accordingly, the use of processing module 102 may enable the corporation to contain knowledge of the access credentials to a relatively small number of people rather than directly providing the access credentials to employees needing access to the secure network.

In one embodiment, processing module 102 may use functionality provided by host device 104. For example, host device 104 may include a user interface comprising a display 114 and a keypad 116. Since, in one embodiment, processing module 102 might not have a user interface, processing module 102 may provide user interaction data to be displayed on display 114 to host device 104 and instruct host device 104 to display the information on display 114. Similarly, processing module 102 may request that host device 104 provide processing module 102 with user interaction data entered by a user on keypad 116.

By way of example, processing module 102 may execute an application for making an online credit card purchase. Processing module 102 may store information related to two different credit cards such as an account numbers, expiration dates, and security codes for the two credit cards. Prior to making an online purchase, processing module 102 may prompt a user to select one of the two credit cards for the purchase. Accordingly, processing module 102 may provide information identifying the first and second credit cards (e.g., a name such as "My Mastercard" or "My Visa card") to host device 104 and request that host device 104 present the information to the user via display 114.

Processing module 102 may then request that host device 104 monitor keypad 116 and return information entered on keypad 116 to processing module 102. In response to the user selecting "My Visa card" via keypad 116, host device 104 may provide processing module 102 with information conveying the keystrokes the user made to select "My Visa card." Processing module 102 may then use the keystroke information provided by host 104 to complete the purchase, for example, as discussed below with respect to FIG. 6.

In one embodiment, processing module 102 might not be capable of communicating directly with base station 110, network 108, or server 106 because it may lack a network interface. Rather, processing module 102 may rely on host device 104 to communicate with base station 110, network 108, and server 106. Accordingly, host device 104 may receive information from processing module 102 and forward the information to server 106. Processing module 102 may encrypt the information sent to host device 104 using, for example, an encryption key to prevent host device 104 from accessing the information. Upon receiving the information, server 106, which may also have the encryption key, may decrypt the information.

Host device 104 may also receive information from server 106 that is intended for processing module 102. Host device 104 may forward the information to processing module 102. Server 106 may encrypt information it sends to processing module 102 to prevent host device 104 from accessing the information. In one embodiment, processing module 102 may disregard information received from host device 104 that is not encrypted according to a particular encryption scheme. Disregarding information not encrypted according to the particular encryption may prevent host device 104 from interacting with processing module 102 other than to relay user interface information between a user interface of host device 104 and processing module 102 and to relay communications between server 106 and processing module 102. In one embodiment, the particular encryption scheme may be known by processing module 102 but not by host device 104.

Referring to FIG. 2, a front view of processing module 102, according to one embodiment, is illustrated. In one embodiment, such as the embodiment illustrated in FIG. 2, processing module 102 may have physical characteristics similar to a Secure Digital (SD) memory card. For example, processing module 102 may comprise a housing having dimensions substantially similar to an SD memory card. Furthermore, processing module 102 may comprise a host device interface 202 configured to be physically and electrically connected to a host device. In one embodiment, host device interface 202 may comprise an SD Input Output (SDIO) interface configured to be plugged into an SD slot of a host device.

Of course, processing module 102 may have a form factor other than an SD form factor. For example, processing module 102 may have the physical characteristics (e.g., dimensions) of a TransFlash, miniSD, microSD, memory stick, compact flash, Multi Media Card (MMC), reduced size MMC, MMC micro, smart media, smart card, mini smart card, or xD memory card. Host device interface 202 may be substantially similar to a corresponding interface of one of the above-mentioned memory card formats. Any other suitable configurations are possible.

Accordingly, processing module 102 may be compatible with a corresponding slot type of one of the above-mentioned memory card formats. Alternatively, host device interface 202 may be a Universal Serial Bus (USB) interface configured to be physically and electrically connected to a USB port of host device 104. Other physical configurations and host device interface formats that enable processing module 102 to be electrically and physically connected to host device 104 are also possible. Although the physical characteristics (e.g., dimensions) of processing module 102 and host device interface 202 may be similar to one of the above-mentioned memory card formats, processing module 102 may perform functionality beyond that performed by a memory card as was discussed above.

Referring to FIG. 2A, an isometric view of processing module 102, according to one embodiment, is illustrated. Processing module 102, in one embodiment, includes housing 204 and circuitry such as host device interface 202 and integrated circuitry 206.

Housing 204 houses and is provided about circuitry 206 and may allow a user to handle processing module 102 without damaging circuitry 206 by surrounding circuitry 206 so that circuitry 206 is not physically exposed to the user. In one embodiment, housing 204 may be different from and removable from a housing (e.g., housing 118 shown in FIG. 1) of host device 104. For example, housing 204 might not contain circuitry of host device 104. Furthermore, during moments in time when processing module 102 is neither physically nor electrically connected to host device 104, the housing of host device 104 might not contain part or all of processing module 102. In one embodiment, processing module 102 may be embedded within host device 104 so that the housing of host device 104 contains processing module 102. In this embodiment, processing module 102 might not be easily removed from host device 104 without tools and expertise.

Circuitry 206 may comprise one or more integrated circuits and may comprise one or more circuit boards. Circuitry 206 may be configured to perform the functionality of processing circuitry 102 as was described above in relation to FIG. 1. For example, circuitry 206 may be configured to request that host device 104 retrieve encrypted code from server 206, receive the encrypted code from host device 104, decrypt the encrypted code, and execute the encrypted code. Circuitry 206 may also be configured to communicate with host device 104 using host device interface 202.

Referring to FIG. 3, processing module 102 is illustrated as being disconnected from host device 104. In one embodiment, processing module 102 may be removably connected to host device 104. In other words, a user of processing module 102 may connect processing module 102 to host device 104 and may later disconnect processing module 102 from host device 104. In one embodiment, the user may disconnect processing module 102 from host device 104 by hand without tools and without damaging processing module 102.

A user may connect processing module 102 to host device 104 by inserting processing module 102 into a housing of host device 104 thereby physically and electrically connecting processing module 102 to host device 104. In one embodiment, processing module 102 may be inserted into a slot formed within the housing of host device 104.

In one embodiment, processing module 102 may be used in more than one host device at different moments in time. For example, a user of processing module 102 may use processing module 102 in host device 104 and may then later use processing module 102 in a different host device.

Referring to FIG. 3A, processing module 102 is illustrated as being physically and electrically connected to host device 104. In one embodiment, processing module 102 may operate by using power supplied by host device 104 and may receive power from host device 104 via host device interface 202. In one embodiment, processing module 102 might not be configured to operate when disconnected from host device 104 other than to store data in non-volatile memory. In another embodiment, processing module 102 includes its own internal power source.

Referring to FIG. 4, a block diagram 400 of one embodiment of processing module 102 is illustrated. Processing module 102 may include storage circuitry 402, processing circuitry 404, and interface 406. Circuitry 206 (described above in relation to FIG. 2A) may include storage circuitry 402 and processing circuitry 404 and in some embodiments may include portions of interface 406.

Processing circuitry 404 may comprise circuitry configured to implement desired programming provided by appropriate media in at least one embodiment. For example, processing circuitry 404 may be implemented as one or more of a processor and/or other structure configured to execute executable instructions including, for example, software and/or firmware instructions, and/or hardware circuitry. Exemplary embodiments of processing circuitry 404 include hardware logic, PGA, FPGA, ASIC, state machines, and/or other structures alone or in combination with a processor. These examples of processing circuitry 404 are for illustration and other configurations are possible.

Storage circuitry 402 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

Interface 406 may be embodied as electronic circuitry. Interface 406 may include host device interface 202. Interface 406 may be configured to communicate with processing circuitry 404. In one embodiment, interface 406 might not be able to communicate with storage circuitry 402 except via permission and/or control of processing circuitry 404, thereby preventing direct communication between interface 406 (or a device connected to interface 406 such as host device 104) and storage circuitry 402 in one embodiment.

In one embodiment, a miniature smart card may comprise storage circuitry 402 and processing circuitry 404. In this embodiment, interface 406 may include a smart card reader to which the smart card is connected as well as host device interface 202. The smart card reader may be physically and electrically connected to host device interface 202. Accordingly, in this embodiment, processing circuitry 404 may communicate with host device 104 via the smart card reader and host device interface 202.

Referring to FIG. 4A, an alternative block diagram 450 of processing module 102 is illustrated according to one embodiment. In addition to storage circuitry 402, processing circuitry 404, and interface 406, processing module 102 may also include a wireless transponder 452. Wireless transponder 452 may be configured to receive a wireless interrogation signal from a wireless interrogator and, in response, transmit a response signal containing an identifier of wireless transponder 452 to the interrogator. In one embodiment, wireless transponder 452 might not transmit a signal unless in response to receiving the interrogation signal. In one embodiment, wireless transponder 452 may be a Radio Frequency Identification (RFID) tag and the interrogator may be an RFID interrogator. The interrogator may be distinct from host device 104 such that the interrogator and host device 104 may communicate with processing module 102 using different channels and might not communicate with each other.

Processing circuitry 404 may control the operation of wireless transponder 452. For example, in one embodiment, processing circuitry 404 may determine the identifier that wireless transponder 452 transmits in response to wireless transponder 452 receiving an interrogation signal. Processing circuitry 404 may select the identifier from among a plurality of identifiers known to processing circuitry 404.

In one embodiment, processing circuitry 404 may selectively enable or disable wireless transponder 452. Wireless transponder 452 may be configured to only communicate with a wireless interrogator when wireless transponder 452 is enabled.

Figure 5:
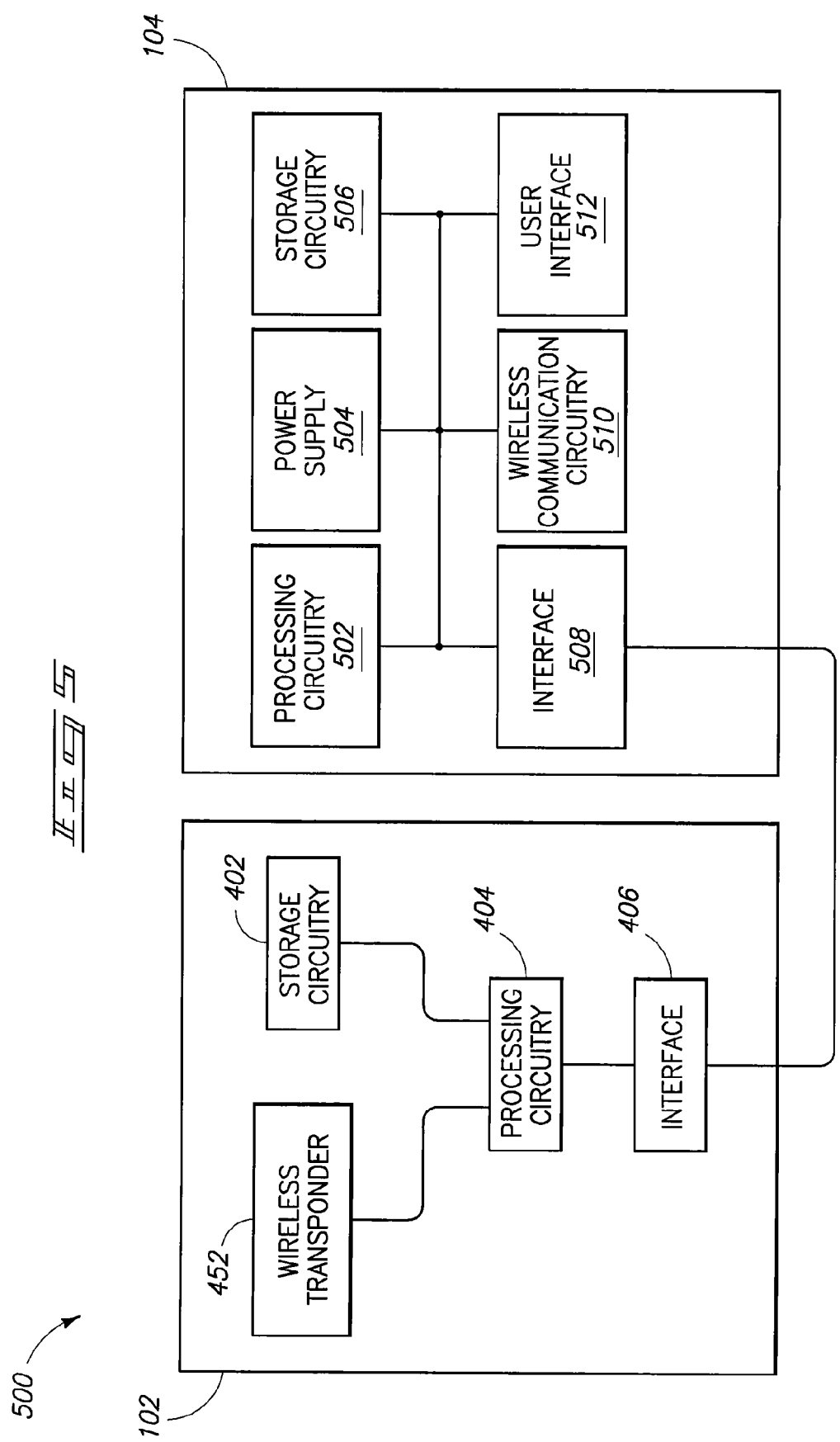
FIG. 5 is a block diagram of a communications system according to one embodiment.

Referring to FIG. 5, a block diagram 500 of processing module 102 and host device 104 is illustrated according to one embodiment. Processing module 102 includes wireless transponder 452, storage circuitry 402, processing circuitry 404, and interface 406 as described above in relation to FIGS. 4 and 4A. Host device 104 includes processing circuitry 502, power supply 504, storage circuitry 506, interface 508, wireless communications circuitry 510, and user interface 512.

Similar to processing circuitry 404, processing circuitry 502 may comprise circuitry configured to implement desired programming provided by appropriate media in at least one embodiment. For example, processing circuitry 502 may be implemented as one or more of a processor and/or other structure configured to execute executable instructions including, for example, software and/or firmware instructions, and/or hardware circuitry. Exemplary embodiments of processing circuitry 502 include hardware logic, PGA, FPGA, ASIC, state machines, and/or other structures alone or in combination with a processor. These examples of processing circuitry 502 are for illustration and other configurations are possible.

Processing circuitry 404 may operate using a first operating system, which may be stored in storage circuitry 402 and processing circuitry 502 may operate using a second operating system, which may be stored in storage circuitry 506. in one embodiment, the first operating system and the second operating system may execute independently. For example, the first operating system may be executed using processing circuitry 404 and might not be configured to control the operation of host device 104 other than to enable interface 406 to send signals to interface 508. Likewise, the second operating system may be executed using processing circuitry 502 and might not be configured to control the operation of processing module 102 other than to enable interface 508 to send signals to interface 406.

In one embodiment, the first operating system may be a different operating system than the second operating system. For example, the first operating system may be VxWorks and the second operating system may be Windows Mobile. In another embodiment, the first and second operating systems may be two different instances of the same operating system. For example, the first and second operating systems may both be Windows Mobile, but they may each be different instances of Windows Mobile. In other words, one copy of Windows Mobile may be used by processing module 102 and another copy of Windows Mobile may be used by host device 104.

Storage circuitry 506 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information.

Power supply 504 may provide power to processing circuitry 502, storage circuitry 506, wireless communications circuitry 510, and user interface 512. In addition, power supply 504 may provide power to processing circuitry 404, wireless transponder 452, and storage circuitry 402 via interface 406 in one embodiment.

Wireless communications circuitry 510 may be configured to communicate with base station 110 in one embodiment. For example, wireless communications circuitry may comprise a wireless transceiver and one or more antennas. User interface 512 may include display 114 and keypad 116, in one embodiment.

Interface 508 may be embodied as electronic circuitry. In one embodiment, interface 508 may include a connector configured to receive interface 406 of processing module 102. Interface 406 and interface 508 may be electrically and physically connected. For example, processing module 102 may be inserted into a receptacle of host device 104 so that interface 406 physically contacts interface 508. Electrical contact may result from electrically conductive portions of interface 406 making physical contact with electrically conductive portions of interface 508.

Processing circuitry 404 may request that processing circuitry 502 retrieve encrypted code from server 106. In response, processing circuitry 502 may send a message to server 106 via base station 110 and network 108 requesting the encrypted code. Upon receiving the encrypted code from server 106, processing circuitry 502 may send the encrypted code to processing circuitry 404. Processing circuitry 404 may decrypt the encrypted code using encryption information known to processing circuitry 404 and server 106, but not to processing circuitry 502.

In one embodiment, the decrypted code may be an application that processing circuitry 404 may execute. As a result of executing the decrypted code, processing circuitry 404 may store data in storage circuitry 402. Processing circuitry 404 may prevent processing circuitry 502 from accessing the data stored in storage circuitry 402 by rejecting requests to access storage circuitry 402 made by processing circuitry 502. Processing circuitry 404 may, in one embodiment, send information to processing circuitry 502 and request that the information be displayed to a user via user interface 512. In response to receiving the information, processing circuitry 502 may display the information via user interface 512. Processing circuitry 404 may request that processing circuitry 502 provide user interaction data (e.g., keystrokes) acquired by user interface 512 to processing circuitry 404.

In one embodiment, processing circuitry 404 may reject messages received from processing circuitry 502 other than messages containing user interaction data received from user interface 512 and messages containing encrypted data sent by server 106. Furthermore, in one embodiment, processing circuitry 404 may reject messages received from processing circuitry 502 in which processing circuitry 502 attempts to control wireless transponder 452. For example, processing circuitry 404 may allow processing circuitry 502 to make function calls using only intentionally exposed interface functions and may reject attempts by processing circuitry 502 to make function calls using unexposed interface functions.

In one embodiment, driver software may be installed on host device 104 to enable processing circuitry 502 to communicate with processing circuitry 404 via interfaces 406 and 508. The driver software may present processing module 102 to processing circuitry 502 according to an established smart card interaction standard (e.g., PC/SC) in one embodiment. In this embodiment, processing circuitry 502 may interact with processing module 102 as if processing module 102 is a smart card using intentionally exposed interface functions.

Since, in one embodiment, processing module 102 may operate using a separate operating system from host device 104, processing module 102 may be connected to host device 104 even if host device 104 uses a different operating system than processing module 102. In fact, in this embodiment, processing module 102 may execute code received from server 106 via host device 104 and execute the code even if the code is incompatible with an operating system running on host device 104. Furthermore, processing module 102 may executed the code without storing the code in storage circuitry 506 and without executing instructions of the code on processing circuitry 502.

Referring to FIG. 6, a communications system 600, according to one embodiment, is illustrated. System 600 includes processing module 102, host device 104, wireless communications base station 110, and wireless interrogator 602.

In one embodiment, host device 104 may communicate with base station 110 using wireless communications circuitry 510 and wireless channel 112 as was described above. Processing module 102 may be physically and electrically connected with host device 104 and may retrieve encrypted code from server 106 via host device 104, channel 112, and base station 110 as was described above.

Processing module 102 may include wireless transponder 452 (discussed above in relation to FIG. 4, but not illustrated in FIG. 6). As was described above, transponder 452 may respond to an interrogation signal transmitted by wireless interrogator 602. In one embodiment, wireless transponder 452 may be an RFID tag and wireless interrogator 602 may be an RFID interrogator. Wireless interrogator 602 may transmit on a different frequency than base station 110 and host device 104. Accordingly, signals transmitted by wireless interrogator 602 might not interfere with wireless channel 112. In one embodiment, interrogator 602 and transponder 452 may communicate with each other via wireless channel 604.

In one embodiment, interrogator 602 may be a wireless point of sale payment terminal. By way of example, processing module 102 may execute an application for making a point of sale purchase involving interrogator 602. A user of processing module 102 may select an item for purchase in a store and take the item to a checkout station where interrogator 602 may be located. Rather than purchasing the item by physically providing a credit or debit card to a sales clerk, the user may place processing module 102 and connected host device 104 proximate to interrogator 602. Interrogator 602 may transmit an interrogation signal to which wireless transponder 452 responds by providing an identifier. The identifier may include, in one embodiment, credit or debit card account information (e.g., account number, PIN, expiration date, etc.). Interrogator 602 may receive the identifier and use the identifier to complete the purchase.

In one embodiment, processing module 102 may store information related to two different credit or debit cards. The information may include account numbers, expiration dates, and security codes for the two cards. Prior to making a purchase, processing module 102 may prompt a user to select one of the two cards for the purchase. Accordingly, processing circuitry 404 may provide information identifying the first and second cards (e.g., a name such as "My Mastercard" or "My Visa card") to processing circuitry 502 and request that processing circuitry 502 present the information to the user via user interface 512.

Processing circuitry 404 may then request that processing circuitry 502 monitor user interface 512 and return information entered via keypad 116 to processing circuitry 404. In response to the user selecting "My Visa card" via keypad 116, processing circuitry 502 may provide processing circuitry 404 with information conveying the keystrokes the user made to select "My Visa card." Processing circuitry 404 may then use the keystroke information to determine which card the user has selected. Processing circuitry 404 may then configure wireless transponder 452 so that wireless transponder 452 provides information associated with the selected card upon being interrogated by interrogator 602.

Accordingly, processing circuitry 404 may configure transponder 452 to provide information associated with one of the cards for one purchase and information associated with a different one of the cards for a different purchase. This may allow a user of processing module 102 to make purchases without presenting the physical credit or debit card and without allowing a sales clerk to surreptitiously acquire account information while handling the physical credit or debit card. In one embodiment, the card information may be stored in storage circuitry 402 and processing circuitry 404 may prevent processing circuitry 502 from accessing the information without authorization.

In one embodiment, processing module 102 may execute an application allowing a user of host device 104 to enable or disable transponder 452. When enabled, transponder 452 may reply to interrogation signals received from interrogator 602. However, when disabled, transponder may receive an interrogation signal from interrogator 602 but might not respond to the interrogation signal. Disabling transponder 452 may prevent someone using an interrogator from surreptitiously acquiring an identifier of transponder 452 by interrogating transponder 452 during periods of time when a user is not aware that transponder 452 is being interrogated.

Furthermore, in one embodiment, processing module 102 may include an indicator 120 indicating whether transponder 452 is enabled or disabled. For example, the indicator may be an LED that is illuminated when transponder 452 is enabled and is not illuminated when transponder 452 is disabled. Alternatively, the indicator may be an audible indicator (e.g., a tone generated by a speaker) that makes an audible noise when transponder 452 is enabled and is silent when transponder 452 is disabled.

In one embodiment, processing circuitry 502 may provide processing circuitry 404 with input acquired from user interface 512 indicating that transponder 452 should be either enabled or disabled. Upon receiving the input, processing circuitry 404 may respectively enable or disable transponder 452. In one embodiment, processing circuitry 404 may prevent processing circuitry 502 from enabling or disabling transponder 452 other than by providing input from user interface 512.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A method comprising:
requesting, by a processor resident in a processing module communicatively coupled to a wireless communications device via a communication interface resident in the processing module, retrieval of encrypted code from a source of encrypted code communicatively coupled to the wireless communications device, the source being external to a memory of the wireless communications device, wherein the wireless communications device is unable to decrypt the encrypted code and the processor rejects messages from the wireless communications device other than messages containing user interaction data or the encrypted code;
receiving, by the processing module via the communication interface, the encrypted code from the wireless communications device responsively to the request;
decrypting, by the processor, the encrypted code, wherein the wireless communications device is unable to access decrypted code; and
executing, by the processor resident in the processing module, the decrypted code.

2. The method of claim 1 wherein the processing module operates using power supplied by the wireless communications device.

3. The method of claim 1 wherein the processing module is unable to communicate with the web site without the wireless communications device.

4. The method of claim 1, wherein the processing module includes a memory, the method further comprising:
generating, by the processor resident in the processing module, data by executing the decrypted code ;and
storing, by the processor resident in the processing module, generated data in the memory such that the wireless communications device is unable to access the data stored in memory.

5. The method of claim 1, wherein the wireless communications device is at least one of a mobile wireless communications device, a mobile wireless telecommunications device, and a cellular wireless communications device.

6. The method of claim 1, wherein execution of the code includes establishing, by wireless communication circuitry resident in the processing module, communication with a second processing module resident in a second wireless communications device.

7. The method of claim 1, wherein the wireless communication device retrieves the encrypted code via a wireless communication with the source.

8. A processing module comprising:
memory configured to store a set of instructions executable by processing circuitry;
a communication interface configured to be communicatively coupled to a wireless communications device; and
the processing circuitry configured to retrieve and execute the set of instructions to request that the wireless communication device retrieve encrypted code from a source of encrypted code communicatively coupled to the wireless communications device, the source being external to a memory of the wireless communications device, receive the encrypted code from the wireless communications device via the communication interface responsively to the request, use the decryption program stored in the memory to decrypt encrypted code received from the wireless communication device, execute the decrypted code, and reject messages from the wireless communications device other than messages containing user interaction data or the encrypted code, wherein the wireless communications device is unable to decrypt the encrypted code or access the decrypted code.

9. The processing module of claim 8 wherein the processing module further comprises a housing, the housing being different than a housing of the wireless communications device and wherein the communication interface is configured to be removably connected to the wireless communications device.

10. The processing module of claim 8 wherein the processing module operates using power supplied by the wireless communications device.

11. The processing module of claim 8 wherein the decryption program is unknown to the wireless communications device.

12. The processing module of claim 8, wherein the wireless communications is at least one of a mobile wireless communications device, a mobile wireless telecommunications device, and a cellular wireless communications device.

13. The processing module of claim 8, wherein the processing circuitry is further configured to generate data by executing the decrypted code and the memory is further configured to store generated data in the memory such that the wireless communications device is unable to access the data stored in the memory.

14. The processing module of claim 8, wherein the processing module is physically and electrically coupled to the wireless communications device.

15. The processing module of claim 8, further comprising:
wireless communication circuitry configured to wirelessly communicate with a second processing module resident in a second wireless communications device.

16. The processing module of claim 15, wherein execution of the decrypted code includes using the wireless communication circuitry to establish communication with the second processing module via the wireless communication circuitry.

* * * * *